A. B. STITES.
REAR SIGNAL FOR AUTOMOBILES.
APPLICATION FILED FEB. 26, 1912.
1,033,208.
Patented July 23, 1912.
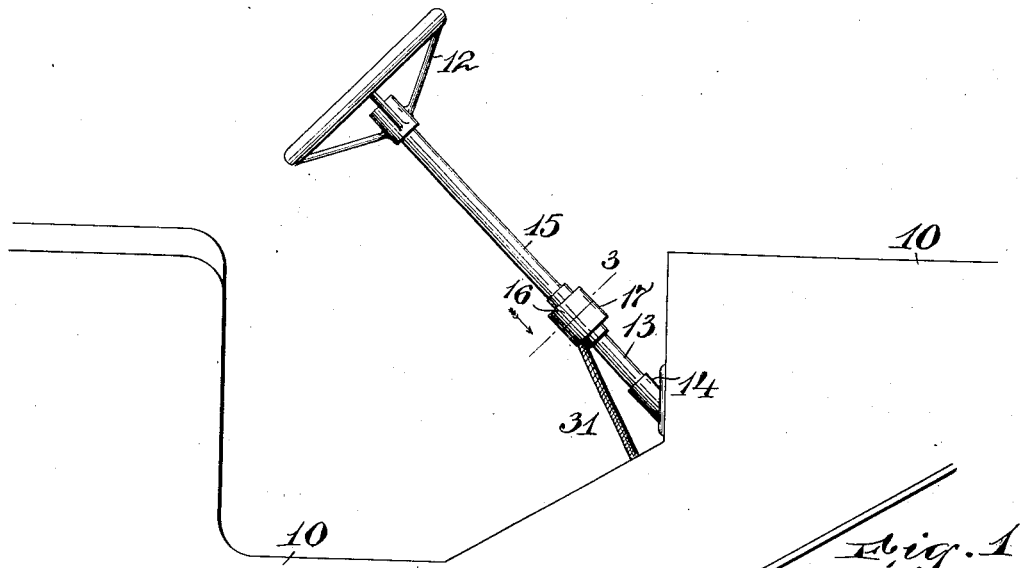
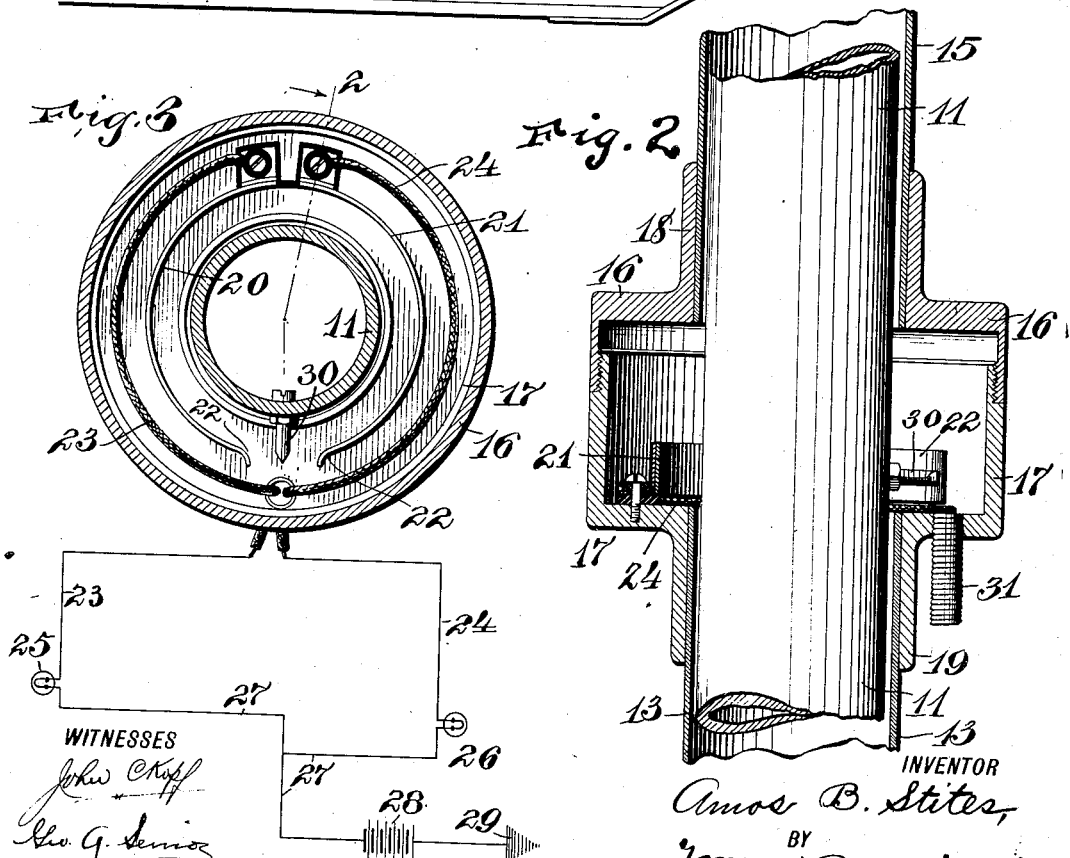
WITNESSES
INVENTOR
Amos B. Stites,
BY
Wm. H. Caufield.
ATTORNEY.

UNITED STATES PATENT OFFICE.

AMOS B. STITES, OF PLAINFIELD, NEW JERSEY.

REAR SIGNAL FOR AUTOMOBILES.

1,033,208.  Specification of Letters Patent. Patented July 23, 1912.

Application filed February 26, 1912. Serial No. 679,824.

*To all whom it may concern:*

Be it known that I, AMOS B. STITES, a citizen of the United States, residing at Plainfield, in the county of Union and State of New Jersey, have invented certain new and useful Improvements in Rear Signals for Automobiles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to an improved signaling or indicating device for automobiles, and is adapted for use both by day and by night, but it is particularly adapted for use at night whereby the driver of a vehicle automatically indicates to a following conveyance a contemplated change of direction, thereby eliminating the necessity of extending the arm as is frequently the case when a change of direction is to be made.

The device comprises contact mechanism arranged around the steering rod, which contacts are in an electric circuit which is also connected with a source of electrical energy and with the indicators which are preferably arranged toward the rear and on opposite sides of the vehicle so that a movement of the steering rod will throw either one or the other of the indicators in circuit, whereby the indicator is operated, whether it be a mechanical indicator or a light.

The invention further consists in details of construction which go to make up a compact and economical structure and one that can be placed on a machine without very much expense or delay.

The invention is illustrated in the accompanying drawing, in which—

Figure 1 is a side view of a part of a vehicle with the steering wheel and the attachment in position. Fig. 2 is a sectional view through the contact device on the steering rod taken on line 2, in Fig. 3, and Fig. 3 is a section on line 3, in Fig. 1, but enlarged, this view also showing in a diagrammatic way the electric circuit, although this particular form of circuit is not the only one that can be employed.

The vehicle 10 is illustrated as being an automobile, but it will be understood that this mechanism can also be used on power boats and similar conveyances. The vehicle is provided with the usual form of steering rod 11, the steering connection of which is not shown, since it is no part of this invention. The steering rod on its top is provided with a steering wheel 12 operated in the usual way. Surrounding the steering rod is a sleeve 13 which is fixed, by means of the bracket 14, to the vehicle, the sleeve having an extension 15, this sleeve and its extension usually being in one piece in the usual type of automobile, but I cut the device away so as to receive a casing made up of two members 16 and 17 which are connected together, preferably by means of a screw-threaded connection, to make a smooth finish, the members 16 and 17 having the flanges 18 and 19, respectively, the flange 19 around the sleeve 13 being tightly fitted so that it is frictionally held in place, this frictional engagement, however permitting its being slid downward under pressure so that when the member 16 is unscrewed from the member 17, the member 17 can be slid down far enough to uncover its contacts to be hereinafter described, and make the mechanism accessible both for installation and for repair. Arranged on the member 17 and suitably insulated are a pair of contacts 20 and 21 which are substantially concentric to the rod 11 and are provided with the outwardly curved ends 22, these ends being spaced apart so that there is a little distance between them to allow for a little play of the steering wheel and its rod. The contact members 20 and 21 are connected with suitable circuit wires 23 and 24 which lead to the indicators 25 and 26 which are conveniently arranged on the vehicle, these in turn, by means of the wires 27, being connected to a source of electric energy 28 such as a battery. The battery 28 is grounded as at 29 to the frame of the machine, and the rod 11 is also grounded to the machine frame so that a rod contact 30, when it is swung and engages either one of the contacts 20 or 21 of the pair of contacts, causes one or the other of the indicators to be energized through the circuit. It will thus be seen that if a driver of a conveyance is going to turn to the right, a movement to the right of his steering wheel, assuming that the rod contact 30 is on the upper side of the rod, will engage the contact 20 and the indicator 25 will be energized and will operate, that is, if it is in the form of a light it will show up plainly to a driver following in another vehicle that the vehicle preceding is about to turn. The concentric formation of the contacts insures the constant lighting of the indicator until the machine is again headed straight ahead. The contact wires 23 and 24 are conducted from the casing, consisting of the members 16 and 17, to the body of the machine through a flexible conduit 31 which protects the wires from the weather and also permits the lowering of the member 17 on the fixed sleeve 13 when the members are separated by the unscrewing of the member 16, the flexibility of the conduit permitting its being doubled or twisted to permit the descent of the member 17 far enough to make its interior accessible for repair purposes.

The device is compact as will be seen from Fig. 1, and is easily attached to cars now in use, since it is only necessary to cut away enough of the sleeve to allow room for the attachment of the members 16 and 17. This device might be constructed to operate without being attached directly to the steering apparatus.

Having thus described my invention, what I claim is:—

1. The combination of a conveyance having a steering rod, a sleeve surrounding the steering rod, with an electrical circuit including the conveyance and the steering rod, a source of electrical energy within the circuit, a casing on the sleeve having a pair of spring contacts substantially concentric to the steering rod, the pair of contacts being connected with the circuit, a set of indicators adapted to be controlled by an electrical circuit passing through one or the other of the pair of contacts, and a contact on the rod normally placed between the pair of contacts aforesaid and adapted to engage either one of the pair of contacts when the rod is swung, whereby one or the other of the indicators is energized through the circuit.

2. The combination of a conveyance having a steering rod thereon, a sleeve surrounding the steering rod, the sleeve being fixed, with a casing comprising two coupled members arranged on the sleeve, the sleeve being cut away between the members, a contact on the rod, a pair of contacts fixed to one of the members, the pair of contacts being made of spring material and substantially concentric to the rod, the pair of contacts being in the path of travel of the contact on the rod when the rod is rotated, the contact on the rod being normally out of contact with the pair of contacts, a pair of indicators, each of which is connected with one of the pair of contacts, a source of electrical energy, and an electrical circuit connected to the source of energy, the indicators and the contacts.

3. In a signal system for conveyances, a steering rod, a fixed sleeve secured to the conveyance and surrounding the rod, a casing on the end of the fixed sleeve, the casing consisting of two members, one member being arranged in frictional contact with the top of the fixed sleeve, a second sleeve secured to the other member of the casing, a flexible conduit extending from the interior of the lower member of the casing to the conveyance to convey circuit wires, a contact on the rod substantially radially arranged thereon, a pair of spring contacts surrounding the rod at a distance therefrom and having their ends separated to form a space for the normal position of the rod contact, the circuit wires being connected to their respective contacts of the pair of contacts, said wires passing through the flexible conduit.

In testimony, that I claim the foregoing, I have hereunto set my hand this 23rd day of February 1912.

AMOS B. STITES.

Witnesses:
Wm. H. Camfield,
M. A. Johnson.